(12) United States Patent
Chen et al.

(10) Patent No.: US 7,042,658 B2
(45) Date of Patent: May 9, 2006

(54) LENS FOR CHROMATIC ABERRATION COMPENSATION

(75) Inventors: Chi-Yuan Chen, Taipei (TW); Chi-Shain Hong, Taipei (TW); Chow-Chin Chuang, Taipei (TW); Jason Wang, Taipei (TW); Steve Hong, Taipei (TW)

(73) Assignee: Synage Technology Corporation, Taipei (TW)

( * ) Notice: Subject to any disclaimer, the term of this patent is extended or adjusted under 35 U.S.C. 154(b) by 74 days.

(21) Appl. No.: 10/710,730

(22) Filed: Jul. 30, 2004

(65) Prior Publication Data
US 2005/0185284 A1  Aug. 25, 2005

(30) Foreign Application Priority Data
Feb. 25, 2004  (TW) .............................. 93104723 A

(51) Int. Cl.
*G02B 3/00* (2006.01)

(52) U.S. Cl. ...................... 359/723; 359/707; 359/724; 359/737; 359/738

(58) Field of Classification Search ................ 359/891, 359/707, 722–724, 737, 738
See application file for complete search history.

(56) References Cited

U.S. PATENT DOCUMENTS

| | | | | |
|---|---|---|---|---|
| 5,829,856 A | * | 11/1998 | Perlo et al. | 353/84 |
| 5,936,773 A | * | 8/1999 | Togino | 359/630 |
| 5,973,846 A | * | 10/1999 | McConica | 359/642 |
| 6,016,222 A | * | 1/2000 | Setani et al. | 359/571 |
| 6,021,003 A | * | 2/2000 | Katsuki et al. | 359/619 |
| 6,137,535 A | * | 10/2000 | Meyers | 348/340 |
| 6,373,603 B1 | * | 4/2002 | Popovich et al. | 359/15 |
| 6,859,229 B1 | * | 2/2005 | Suda | 348/273 |
| 2002/0008920 A1 | * | 1/2002 | Mihara et al. | 359/684 |
| 2002/0089596 A1 | * | 7/2002 | Suda | 348/302 |
| 2002/0149717 A1 | * | 10/2002 | Borrelli et al. | 349/95 |

* cited by examiner

*Primary Examiner*—Evelyn A. Lester
(74) *Attorney, Agent, or Firm*—Jianq Chyun IP Office

(57) ABSTRACT

A lens for chromatic aberration compensation is provided. The lens includes a lens body and a plurality of color filter films. The lens body has a light incident plane, a light exit plane and an optical axis. The light incident plane and/or the light exit plane comprises a plurality of discrete area, wherein the area comprises, for example but not limited to, a plurality of annular areas, fan-shaped areas, or polygon areas. The color filter films are disposed over the areas of the lens body respectively, and comprise red color filter films, green color filter films or blue color filter films. Accordingly, the lens for chromatic aberration compensation of the invention can eliminate the aberration effectively.

17 Claims, 4 Drawing Sheets

LENS FOR CHROMATIC ABERRATION COMPENSATION

CROSS REFERENCE TO RELATED APPLICATIONS

This application claims the priority benefit of Taiwan application serial no. 93104723, filed Feb. 25, 2004.

BACKGROUND OF INVENTION

1. Field of the Invention

The present invention generally relates to a lens. More particularly, the present invention relates to a lens for chromatic aberration compensation.

2. Description of Related Art

In recent years, a variety of optical electronic device have been developed, wherein the lens is a major and an important optical components. The lens may be used in, for example, the brightness enhancement layer of the backlight module of the display panel of mobile phone, or camera, or in the optical pickup head of CD-ROM, VCD-ROM, or DVD-ROM. Especially, lens is an important component of digital still camera (DSC) and digital video camera (DVC). The reliability of the optical products is considerably dependent on the processing of the light source via the lens. Conventionally, if white light is used as the light source of the optical products, generally the aberration is generated.

FIG. 1A is a drawing schematically illustrating the aberration generated by a conventional white light via a lens. Referring to FIG. 1A, a conventional lens 10 includes a light incident plane 12, a light exit plane 14 and an optical axis 16. When the white light W is incident to lens 10 parallel to the optical axis 16 via the light incident plane 12 of the lens 10, the white light W is refracted by the lens 10. Then, the white exits the lens 10 via the light exit plane 14. Thereafter, the white light W is refracted into at least three primary color light, such as a blue light B, a green light G and a red light R respectively. Since the wavelengths of the blue light B, the green light G and the red light R are not the same, the intersections of the blue light B, the green light G and the red light R with the optical axis 16 (i.e., the positions b, g, and r shown in FIG. 1A) are not the same. Therefore, the aberration of the white light is generated.

The generation of aberration is proportional to the dispersion of the lens. Accordingly, elimination of generation of aberration is highly desirable. Therefore, specific achromatic lens system or apochromatic lens system for eliminating aberration have been developed. The conventional lens system described above is generally composed of at least two different lenses.

FIG. 1B is a drawing schematically illustrating a conventional lens system for eliminating aberration. Referring to FIG. 1B, a conventional lens system 100 includes a crown glass lens 110 and a flint glass lens 120, wherein the crown glass lens has a lower dispersion than the flint glass lens. The crown glass lens 110 includes a light incident plane 112, light exit plane 114 and an optical axis 116. When the white light W is incident to the lens 110 via the light incident plane 112 parallel to the optical axis 116, after the refraction via the crown glass lens 110 and flint glass lens 120, the intersections of the color light R and B with the optical axis 116 are the same. Therefore, the aberration between the blue light B and the red light R is compensated by the lens system 100.

It is noted that the conventional lens system 100 is composed of at least two different lenses such as lenses 110 and 120, and the compensation effect to the chromatic aberration of the lens system 100 is dependent on the arrangement of these lenses. Therefore, any tiny defect, such as the error in the installation of the lens system 100, the error in the size of the lens, or a shock or crack in the lens system 100 will obviously influence the compensation effect to the chromatic aberration. Therefore, the yield rate of the lens system 100 is low and cost is high.

SUMMARY OF INVENTION

Accordingly, the present invention is directed to a lens for chromatic aberration compensation to compensate the aberration due to refracted light.

The lens for chromatic aberration compensation according to an embodiment of the present invention comprises, for example but not limited to, a lens body and a plurality of color filter films. The lens body has a light incident plane and a light exit plane, wherein the light incident plane and/or light exit plane comprises a plurality of discrete areas, and a plurality of color filter films are disposed on the areas of the lens body respectively.

In one embodiment of the invention, the lens body has an optical axis, and the areas comprises a plurality of annular areas, fan-shaped areas, or polygon areas, wherein the annular areas have different sizes and are concentric to the optical axis.

In one embodiment of the invention, the lens body comprises Fresnel lens.

In one embodiment of the invention, the lens body comprises spherical lens or aspheric lens.

In one embodiment of the invention, a material of the lens body comprises glass or plastic.

In one embodiment of the invention, the color filter films comprise red color filter films, green color filter films and/or blue color filter films.

Accordingly, the present invention provides a plurality of color filter films disposed over the area of the lens body, the color light via the color filter film may be controlled by the color filter films of different colors. Therefore, in the lens for chromatic aberration compensation according to an embodiment of the present invention, only the shape, thickness and the position of the area of the lens body are required to be optimized. In addition, different color filter films of different colors are dispose in corresponding areas. Therefore, the aberration generated by the light source can be compensated. It is noted that, in the present invention, only one single lens is required to compensate the aberration. Thus, the yield of manufacturing the lens for chromatic aberration compensation can be effectively increased.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The following drawings illustrate embodiments of the invention and, together with the description, serve to explain the principles of the invention.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
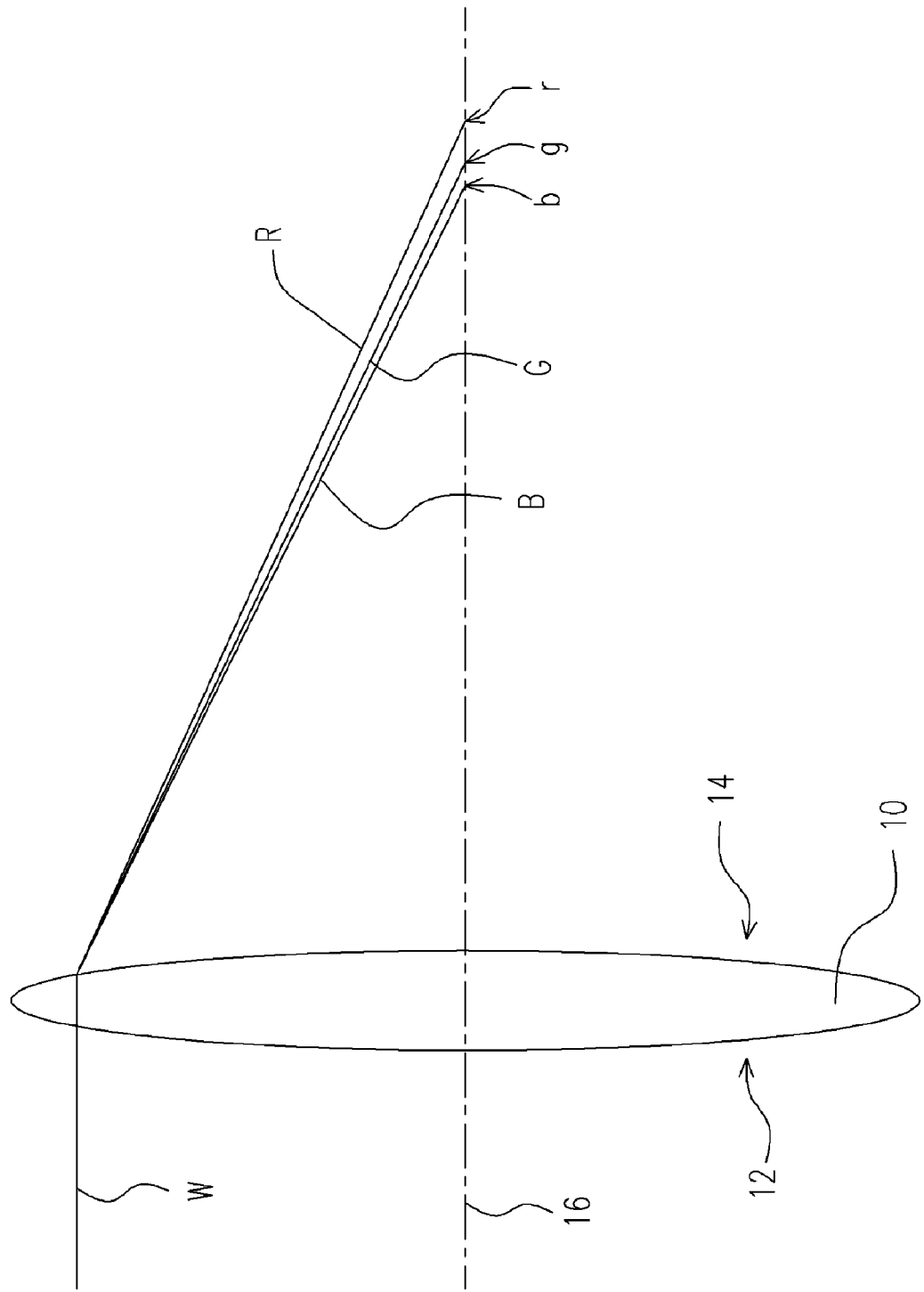
FIG. 1A is a drawing schematically illustrating the aberration generated by a conventional white light via a lens.
Figure 1B:
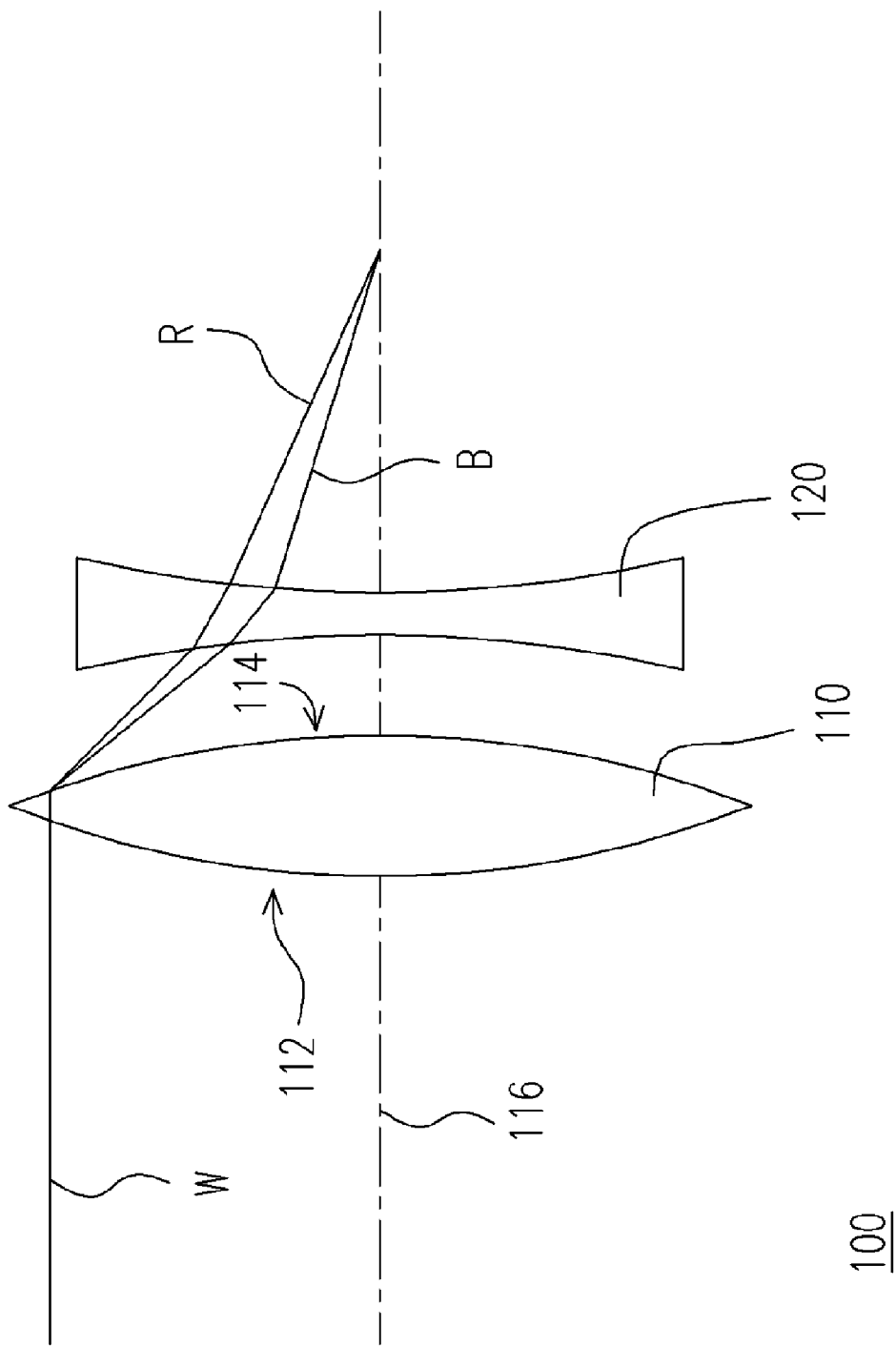
FIG. 1B is a drawing schematically illustrating a conventional lens system for eliminating aberration.
Figures 2A, 2B:
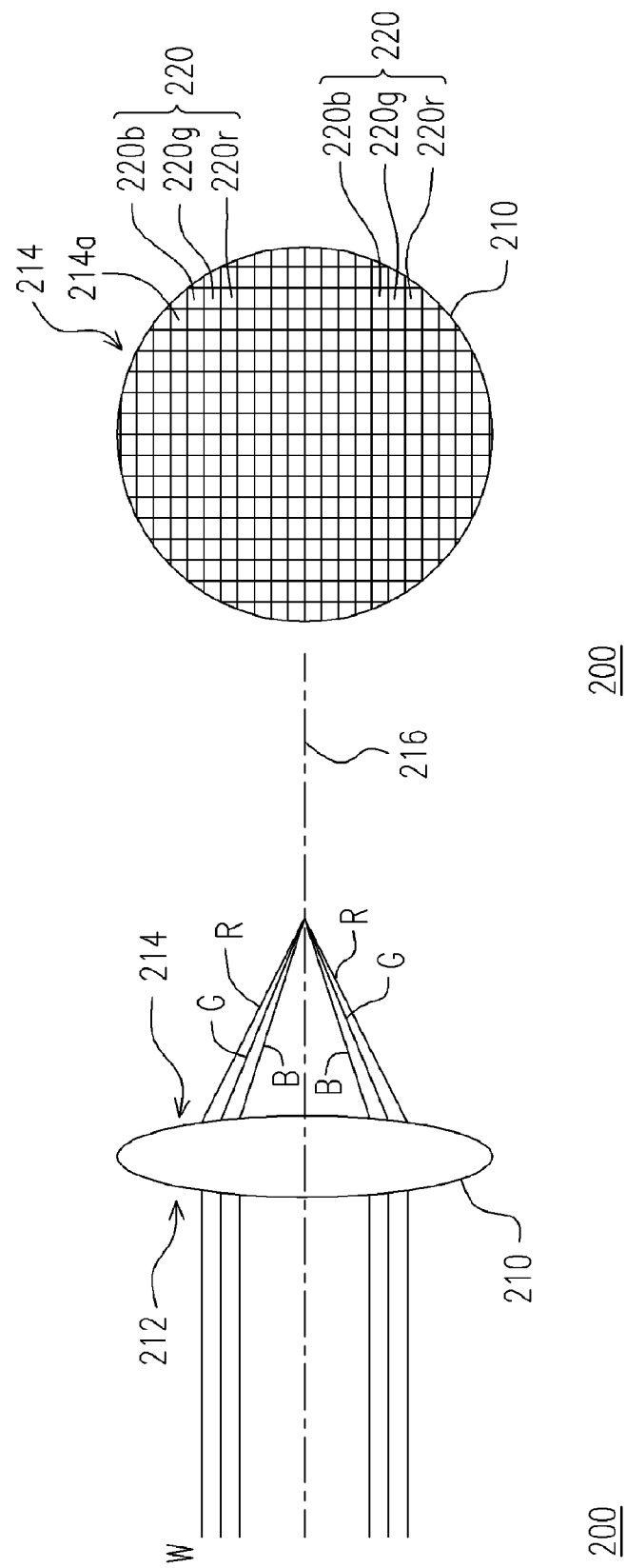
FIG. 2A is a drawing schematically illustrating a lens for chromatic aberration compensation according to an embodiment of the present invention.
FIG. 2B is a drawing schematically illustrating the light exit plane of a lens for chromatic aberration compensation shown in FIG. 2A.

FIG. 2A is a drawing schematically illustrating a lens for chromatic aberration compensation according to an embodiment of the present invention. FIG. 2B is a drawing schematically illustrating the light exit plane of a lens for chromatic aberration compensation shown in FIG. 2A. Referring to FIG. 2A and FIG. 2B, the lens for chromatic aberration compensation 200 comprises, for example but not limited to, a lens body 210 and a plurality of color filter films 220. The lens body 210 has a light incident plane 212, a light exit plane 214 and an optical axis 216. The light incident plane 212 or the light exit plane 214 is composed of a plurality of discrete areas 214a (not shown). The color filter films 220 comprises red color filter films 220r, green color filter films 220g or blue color filter films 220b respectively disposed on the areas 214a (not shown) of the light incident plane 212 or the light exit plane 214 of the lens body 210. The lens body 210 comprises, for example but not limited to, a spherical lens, an aspheric lens, or a Fresnel lens. The lens body 210 is comprises of, for example but not limited to, transparent material such as glass or plastic, therefore, light can pass the lens body 210 and be refracted.

Referring to FIG. 2A and FIG. 2B, when the white light W is incident to the lens body 210 via the light incident plane 212 parallel to the optical axis 216, the white light W is refracted by the lens body 210. Then, the white light W exits the lens body 210 via the light exit plane 214, wherein the white light W is refracted to a blue light B, a green light G and a red light R. The red color filter films 220r, the green color filter films 220g or the blue color filter films 220b are disposed on the discrete areas 214a of the light incident plane 212 or the light exit plane 214. The optical paths of the color light R, G, B via the color filter films are controlled by the color filter films 220r, 220g, and 220b. In one embodiment of the invention, the shape, thickness and position of the areas 214a of the light incident plane 212 or the light exit plane 214 of the lens body 210 are optimized. In addition, the color filter films 220r, 220g, 220b are dispose at corresponding areas 214a. Therefore, the aberration is compensated. In one embodiment of the invention, the shape of the areas 214 of the light exit plane 214 of the lens body 210 is, for example but not limited to, ones illustrated in the figures.

Referring to FIG. 2B, the shape of the discrete areas 214a of the light exit plane 214 of the lens body 210 of the lens for chromatic aberration compensation 200 is composed of, for example but not limited to, a plurality of areas defined by the lines parallel to and perpendicular to the optical axis 216. The design of the discrete areas of the light incident plane 212 of the lens body 210 can be the same as the areas 214a of the light exit plane, or be designed in another shape.

Hereinafter, FIG. 3A to FIG. 3F are drawings schematically illustrating the area of the light exit plane of the lens for chromatic aberration compensation of the present invention. However, the area of the light incident plane may be the same as the area of the light exit plane, or may be different. The shapes of the light exit plane or the light incident plane of the lens for chromatic aberration compensation of FIG. 3A to FIG. 3F are different. In addition, the other components of FIG. 3A to FIG. 3F are similar to the components of the lens for chromatic aberration compensation of FIG. 2A having the same reference number. The position of the area for disposing the color filter films of different colors is dependent on the reflective index of each area. Therefore, the reference numbers of the color filter films of different colors of FIG. 3A to FIG. 3F are dependent on the design of the reflective index of each area.

Figure 3A:
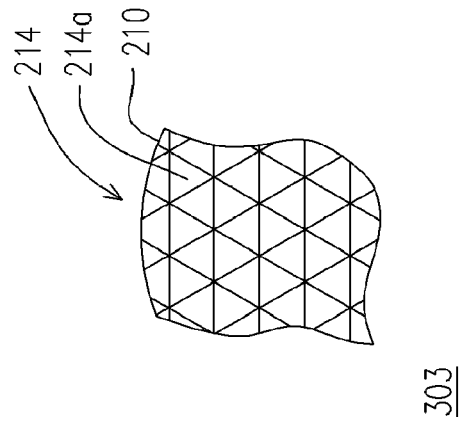
FIG. 3A is a drawing schematically illustrating an annular area of a light exit plane of a lens for chromatic aberration compensation according to one embodiment of the present invention.

FIG. 3A is a drawing schematically illustrating an annular area of a light exit plane of a lens for chromatic aberration compensation according to one embodiment of the present invention. Referring to FIG. 3A, a plurality of discrete areas 214a of the light exit plane 214 of the lens body 210 of the lens for chromatic aberration compensation 301 comprises, for example but not limited to, a plurality of annular areas 214a arranged concentric to the optical axis 216.

Figure 3B:
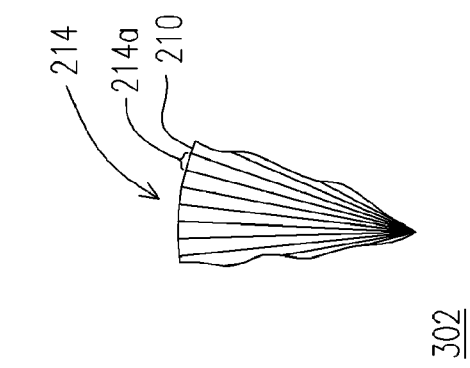
FIG. 3B is a drawing schematically illustrating a fan-shaped area of a light exit plane of a lens for chromatic aberration compensation according to one embodiment of the present invention.

FIG. 3B is a drawing schematically illustrating a fan-shaped area of a light exit plane of a lens for chromatic aberration compensation according to one embodiment of the present invention. Referring to FIG. 3B, the light exit plane 214 of the lens body 210 of the lens for chromatic aberration compensation 302 comprises, for example but not limited to, a plurality of discrete fan-shaped areas 214a.

Figure 3C:
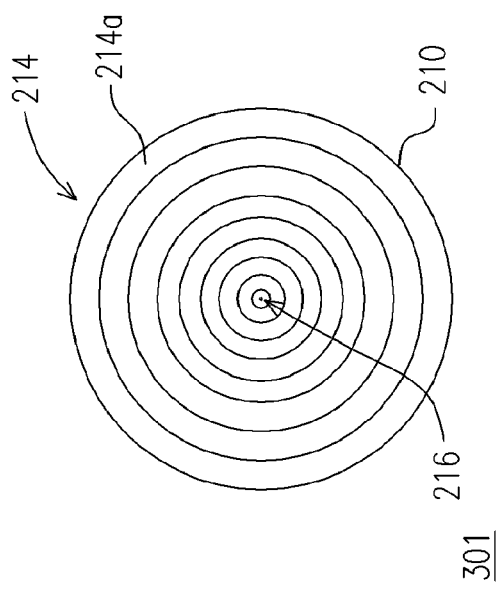
FIG. 3C is a drawing schematically illustrating a triangle area of a light exit plane of a lens for chromatic aberration compensation according to one embodiment of the present invention.

FIG. 3C is a drawing schematically illustrating a triangle area of a light exit plane of a lens for chromatic aberration compensation according to one embodiment of the present invention. Referring to FIG. 3C, the light exit plane 214 of the lens body 210 of the lens for chromatic aberration compensation 303 comprises, for example but not limited to, a plurality of discrete triangle areas 214a.

Figure 3D:
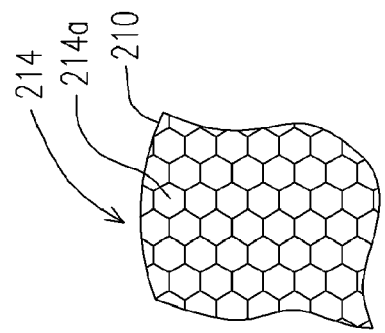
FIG. 3D is a drawing schematically illustrating a polygon area of a light exit plane of a lens for chromatic aberration compensation according to one embodiment of the present invention.

FIG. 3D is a drawing schematically illustrating a polygon area of a light exit plane of a lens for chromatic aberration compensation according to one embodiment of the present invention. Referring to FIG. 3D, the light exit plane 214 of the lens body 210 of the lens for chromatic aberration compensation 304 comprises, for example but not limited to, a plurality of discrete polygon areas 214a.

Figure 3E:
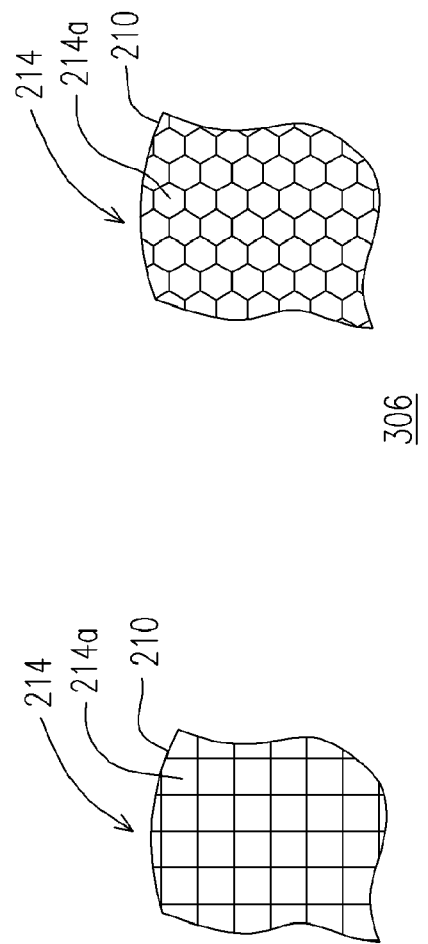
FIG. 3E is a drawing schematically illustrating a rectangular area of a light exit plane of a lens for chromatic aberration compensation according to one embodiment of the present invention.

FIG. 3E is a drawing schematically illustrating a rectangular area of a light exit plane of a lens for chromatic aberration compensation according to one embodiment of the present invention. Referring to FIG. 3E, the light exit plane 214 of the lens body 210 of the lens for chromatic aberration compensation 305 comprises, for example but not limited to, a plurality of discrete rectangular areas 214a.

Figure 3F:
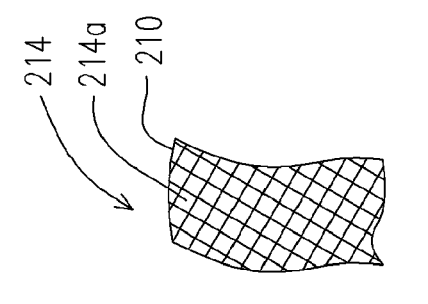
FIG. 3F is a drawing schematically illustrating a beehive shape of a light exit plane of a lens for chromatic aberration compensation according to one embodiment of the present invention.

FIG. 3F is a drawing schematically illustrating a beehive shape of a light exit plane of a lens for chromatic aberration compensation according to one embodiment of the present invention. Referring to FIG. 3F, the light exit plane 214 of the lens body 210 of the lens for chromatic aberration compensation 306 comprises, for example but not limited to, a plurality of discrete beehive areas 214a.

In one embodiment of the invention, the shape of the area of the light exit plane or the light incident plane of the lens for chromatic aberration compensation comprises any other shape except for the shape described in FIG. 3A to FIG. 3F. In another embodiment of the invention, the shape of the area of the light exit plane of the lens for chromatic aberration compensation comprises the combination of the shape of the area described in the embodiments of FIG. 2B or FIG. 3A to FIG. 3F.

It is noted that, the lens for chromatic aberration compensation of the present invention may be a single lens. In addition, the lens may be manufactured by precision mould insert process or by precision plastic injection process to increase the precision of the spherical or the aspheric plastic lens. Therefore, the consistency, the repeatability and the efficiency of the manufacturing process of the plastic lens can be increased. For example, the light reflective index of each plastic lens manufactured by the process described above can be more incident, and thus the yield of the plastic lens is increased.

In addition, the lens for chromatic aberration compensation of the present invention can also be applied to Fresnel lens. The Fresnel lens is very suitable for a variety of optical appliance with thin lens, especially, for example, the brightness enhancement layer of the backlight module of the display panel of mobile phone or camera, or the pickup head of DVD-ROM.

Accordingly, in design the lens for chromatic aberration compensation of the present invention, only the shape, thickness and position of the area of the lens body are necessary to be optimized. Therefore, by disposing different color filter films over the corresponding areas, the aberration can be compensated effectively. In addition, in the present invention, only a single lens us necessary for the compensation of chromatic aberration. In comparison with the conventional lens for chromatic aberration that requiring at least two lens with different reflective index, the present invention can reduce the error of lens installation effectively, and increase the yield of the lens effectively.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A lens for chromatic aberration compensation, comprising:
   a lens body, having a light incident plane and a light exit plane, wherein the light exit plane comprises a plurality of discrete first areas; and
   a plurality of color filter films, disposed over the first areas of the lens body respectively.

2. The lens of claim 1, wherein the lens body has an optical axis, and the first areas comprise a plurality of annular areas with different size and arranged concentric to the optical axis.

3. The lens of claim 1, wherein the first area comprises fan-shaped area or polygon area.

4. The lens of claim 1, wherein the light incident plane is composed of a plurality of discrete second areas.

5. The lens of claim 4, wherein the lens body has an optical axis, and the second areas comprise a plurality of annular areas with different size and arranged concentric to the optical axis.

6. The lens of claim 4, wherein the second area comprises fan-shaped area or polygon area.

7. The lens of claim 1, wherein the lens body comprises Fresnel lens.

8. The lens of claim 1, wherein the lens body comprises spherical lens or aspheric lens.

9. The lens of claim 1, wherein a material of the lens body comprises glass or plastic.

10. The lens of claim 1, wherein the color filter films comprises red color filter films, green color filter films or blue color filter films.

11. A lens for chromatic aberration compensation, comprising:
    a lens body, having a light incident plane and a light exit plane, wherein the light incident plane comprises a plurality of discrete areas; and
    a plurality of color filter films, disposed over the discrete areas of the lens body respectively.

12. The lens of claim 11, wherein the lens body has an optical axis, and the discrete areas comprises a plurality of annular areas with different size and arranged concentric to the optical axis.

13. The lens of claim 11, wherein the discrete area comprises fan-shaped area or polygon area.

14. The lens of claim 11, wherein the lens body comprises Fresnel lens.

15. The lens of claim 11, wherein the lens body comprises spherical lens or aspheric lens.

16. The lens of claim 11, wherein a material of the lens body comprises glass or plastic.

17. The lens of claim 11, wherein the color filter films comprise red color filter films, green color filter films or blue color filter films.

* * * * *